United States Patent [19]

Fergg et al.

[11] 4,383,748
[45] May 17, 1983

[54] CASSETTE FOR FILM UNITS

[75] Inventors: Berthold Fergg; Viktor Osegowitsch, both of Taufkirchen; Wolfgang Viehrig, Munich, all of Fed. Rep. of Germany

[73] Assignee: Agfa-Gevaert Aktiengesellschaft, Leverkusen, Fed. Rep. of Germany

[21] Appl. No.: 328,382

[22] Filed: Dec. 7, 1981

Related U.S. Application Data

[63] Continuation of Ser. No. 97,719, Nov. 27, 1979, abandoned.

[30] Foreign Application Priority Data

Nov. 30, 1978 [DE] Fed. Rep. of Germany ....... 2851891

[51] Int. Cl.³ ............................................. G03B 19/10
[52] U.S. Cl. .................................................. 354/179
[58] Field of Search .................. 354/83, 86, 159, 174, 354/178, 179; 355/27, 44, 72

[56] References Cited

U.S. PATENT DOCUMENTS

| | | | |
|---|---|---|---|
| 910,052 | 1/1909 | Finkle | 354/179 |
| 1,015,514 | 1/1912 | Schuttauf | 354/179 |
| 1,357,164 | 10/1920 | Hantsch | 354/179 |
| 4,026,651 | 5/1977 | Vitou | 355/44 |
| 4,229,090 | 10/1980 | Driscoll et al. | 354/86 |

FOREIGN PATENT DOCUMENTS 459175 4/1928 Fed. Rep. of Germany .
471213 2/1929 Fed. Rep. of Germany .
1214539 10/1966 Fed. Rep. of Germany .

Primary Examiner—John Gonzales
Attorney, Agent, or Firm—Kontler, Grimes & Battersby

[57] ABSTRACT

A cassette containing a stack of film units having overlapping positive and negative sheets has a housing with first and second side walls having first and second openings, and a light-admitting aperture between the two side walls. The film units are stored in a first compartment of the housing adjacent to the aperture in such a way that the foremost unit is in register with the opening in one of the side walls. A discrete withdrawing strip for each film unit has an inner portion adhering to the rear side of the respective unit and an outer portion extending outwardly through the opening in the other side wall. The withdrawing strips form a bundle which extends through a channel connecting the first compartment with a second compartment behind the stacked film units. When a withdrawing strip is extracted from the housing, its inner portion is peeled off the rear side of the corresponding freshly exposed film unit while the latter leaves the housing via the opening in the one side wall and enters a developing unit. A cover sheet is located in front of the foremost film unit or in front of each film unit to allow for the making of a test exposure in a photographic copying machine prior to extraction of the cover sheet with the help of an additional withdrawing strip which extends outwardly through the opening in the other side wall of the housing.

20 Claims, 3 Drawing Figures

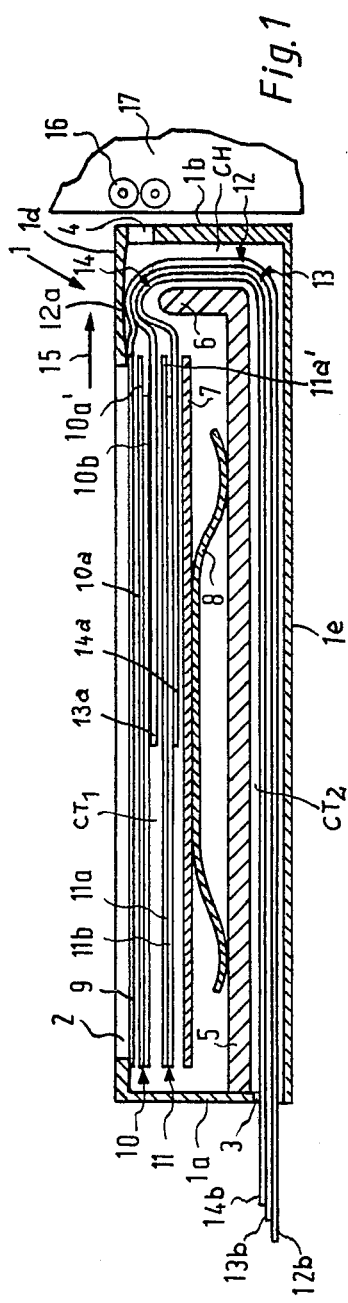
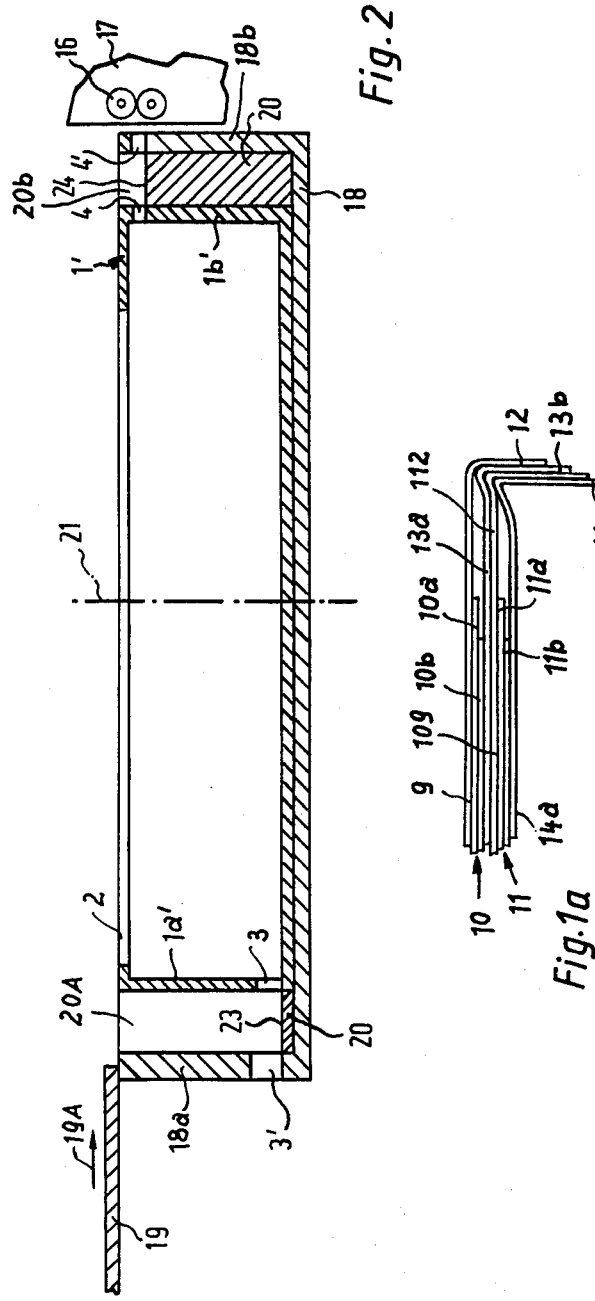

CASSETTE FOR FILM UNITS

This application is a continuation of application Ser. No. 097,719, filed Nov. 27, 1979, abandoned.

BACKGROUND OF THE INVENTION

The present invention relates to containers for unexposed photographic materials, and more particularly to improvements in cassettes for film units, namely, for assemblies including several sheets of photographic material. As a rule, a film unit comprises a negative sheet and a positive sheet which overlaps or is overlapped by the negative sheet.

It is already known to provide a cassette for a stack of film units with an aperture which admits light during exposure of the foremost film unit to scene light. It is also known to connect each film unit with a flexible withdrawing element which serves to effect extraction of an exposed film unit from the housing of a cassette. The withdrawing elements extend outwardly through an opening of the housing.

German Pat. No. 471,213 discloses a cassette wherein a freshly exposed film unit can be withdrawn into a compartment which is located behind the stack of film units. The compartment receives successive exposed film units and is accessible only upon exposure of the last film unit of the entire stack. This is impractical in many instances, e.g., when it is necessary to immediately develop an enlarged image of an original in a photographic copying machine.

German Pat. No. 1,214,539 discloses a cassette for use in an instant-picture camera. The film units (each of which consists of two sheets) are connected with flexible withdrawing elements projecting outwardly through a lateral slot-shaped opening of the housing of the cassette. The withdrawing elements extend through the nip of two rollers which serve to rupture a pod containing a developing fluid which is thereupon spread between the sheets of the respective unit so as to insure that the freshly exposed image is developed in automatic response to extraction of the corresponding withdrawing element. Cassettes of the just outlined character are not suited for use in apparatus or machines wherein the freshly exposed film units should or must be developed at a location other than in the interior of or during withdrawal from the housing of a cassette.

OBJECTS AND SUMMARY OF THE INVENTION

An object of the invention is to provide a novel and improved cassette for stacked film units which renders it possible to withdraw successive freshly exposed film units for development outside of the housing of the cassette.

Another object of the invention is to provide a cassette which allows for the making of test exposures prior to exposure of the images of originals onto film units.

A further object of the invention is to provide the cassette with a novel and improved housing and with novel and improved film units for use in such housing.

An additional object of the invention is to provide a cassette which can store large or small film units and which can be rapidly converted for use with film units of any one of several different sizes and/or shapes.

Another object of the invention is to provide the cassette with novel and improved means for guiding the withdrawing elements for discrete film units.

An additional object of the invention is to provide a novel and improved cassette for film units which can be utilized with advantage in photographic copying and enlarging machines of the type having a camera connected with a developing unit for freshly exposed film units.

An ancillary object of the invention is to provide novel and improved connections between the film units and the associated withdrawing elements of a cassette for film units.

The invention is embodied in a cassette or container comprising a stack of film units each of which has several (e.g., two) overlapping panels or sheets and a flexible first withdrawing element (hereinafter called strip for short) which includes a first portion separately connected with the corresponding unit and a second portion extending beyond the leader of the respective unit. The cassette comprises a preferably flat housing having spaced-apart first and second openings and serving to store the stack of film units. The housing is further provided with an aperture for admission of light during exposure of the nearest film unit of the stack, and the housing also comprises or contains means for deflecting the second portions of the withdrawing strips toward one of the openings. The second portions of the strips extend through and outwardly beyond the one opening so as to be extractible from the housing with attendant entry of the leaders of the corresponding film units into the other opening of the housing. As the extraction of the second portion of a strip proceeds, the corresponding film unit is expelled from the housing via the other opening, or the partially expelled film unit advances into the range of driven rolls or other suitable means for transporting successively exposed film units toward, into and through a developing station, e.g., the developing station of a photographic copying machine wherein the components of the developing unit may but need not be installed in an enclosure for other units, e.g., for a photocopier or enlarger.

The first portions of the withdrawing strips are preferably separable from the corresponding film units in response to travel of the respective second portions along a first path which deviates from the path of movement of the corresponding film units. The first path is defined by the deflecting means and extends to the one opening of the housing. This first path deviates sufficiently from the path of movement of the film units, while the leaders of such units are advanced toward the other opening, to effect automatic separation of the first portions of strips from the corresponding film units while the second portions of the strips move along the first path to thereby cause entry of the leaders of the corresponding film units into the other opening. A cover is provided in front of each film unit in the stack to allow for the making of a test exposure prior to exposure of the film unit therebehind. The covers can be extracted from the housing by means of additional withdrawing elements.

The novel features which are considered as characteristic of the invention are set forth in particular in the appended claims. The improved cassette itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a longitudinal sectional view of a cassette which embodies one form of the invention, further showing a portion of a developing unit for freshly exposed film units;

FIG. 1a is a fragmentary side elevational view of a stack of film units, cover sheets and withdrawing elements which can be used as a substitute for the stack in the housing of the cassette shown in FIG. 1; and FIG. 2 is a similar longitudinal sectional view of the housing of a second cassette which further includes a casing for the housing.

DESCRIPTION OF THE PREFERRED EMBODIMENTS

FIG. 1 shows a container or cassette with several film units (two shown at 10 and 11) which form a stack of overlapping film units in the first or front compartment $CT_1$ of a flat housing 1 which may consist of a suitable synthetic plastic or metallic material. The housing 1 has two side walls 1a, 1b which are located opposite each other and are respectively formed with slit-shaped openings 3, 4 extending at right angles to the plane of FIG. 1. The front wall or panel 1d of the housing 1 has a relatively large aperture 2 for admission of light during exposure of the foremost film unit 10 in the compartment $CT_1$. The housing 1 further contains a deflecting device including a partition 5 which is located behind the rearmost film unit (11) in the compartment $CT_1$ and defines with the rear wall 1e of the housing 1 a second compartment $CT_2$ communicating with the opening 3 as well as with a channel CH. The latter is adjacent to the inner side of the wall 1b and connects the compartments $CT_1$ and $CT_2$ to each other. The front part of the opening 4 is flush with the inner side of the front wall 1d of the housing 1, i.e., it is closely adjacent to the plane of the aperture 2 in the front wall 1d. The channel CH is actually defined by a direction-changing projection or baffle 6 of the partition 5. The free end of the projection 6 is rounded so as to reduce friction between the deflecting means and successive withdrawing elements 12, 13, 14 having first or inner portions 12a, 13a, 14a in the compartment $CT_1$ and second or outer portions 12b, 13b, 14b extending from the compartment $CT_1$, through the channel CH, through the compartment $CT_2$ and through and outwardly beyond the opening 3 in the side wall 1a of the housing 1. The direction in which the first portions 12a, 13a, 14a of the withdrawing elements 12, 13, 14 can be extracted from the compartment $CT_1$ (and in which the parts connected to the respective first portions 12a, 13a, 14a leave the compartment $CT_1$) is indicated by the arrow 15.

The portion 12a of the withdrawing element 12 is connected to or made integral with the leader (right-hand marginal portion) of a cover sheet 9 having a preferably white or whitish front surface facing the aperture 2 in the wall 1d. This sheet serves to shield the foremost film unit 10 from light in a photographic copying machine or the like. Reference may be had to the commonly owned copending application Ser. No. 096,742 filed Nov. 23, 1979 by Otto Stemme et al. The purpose of the cover sheet 9 is to enable an attendant to make a "test exposure" (i.e., to accurately focus the image of an object to be copied) prior to the making of an exposure on the film unit 10 which is immediately behind the cover sheet 9. The latter is withdrawn from the compartment $CT_1$ via channel CH, compartment $CT_2$ and opening 3 in response to exertion of a pull upon the outer portion 12b of the withdrawing element 12.

The foremost or outermost film unit 10 comprises a negative sheet 10a and a positive sheet 10b which is overlapped by the sheet 10a. That portion (10a') of the negative sheet 10a which extends beyond the right-hand marginal portion of the sheet 10b constitutes the leader of the film unit 10 and is in register with the opening 4 in the side wall 1b of the housing 1. The first portion 13a of the withdrawing element 13 for the film unit 10 adheres to but is separable from the rear side of the sheet 10b, i.e., that side which faces away from the aperture 2 and sheet 10a. The length of the portion 13a (as considered in the direction of the arrow 15) is a fraction (e.g., one-half) of the length of the sheet 10b. Separation of the portion 13a from the rear side of the sheet 10b takes place while the portion 13a and the film unit 10 move in the direction of the arrow 15 and the angle between that part of the portion 13a which engages the projection 6 and the plane of the sheet 10b is at least 30 degrees. Thus, when the portion 13b is pulled outwardly through the opening 3, the leader 10a' of the film unit 10 enters into and moves outwardly beyond the opening 4 in the side wall 1b and is advanced into the nip of two rolls 16 which are installed in a developing unit 17 wherein the images of objects on the film units 10, 11 are developed, for example, in a manner as disclosed in the aforementioned commonly owned copending patent application Ser. No. 096,742 filed Nov. 23, 1979 by Otto Stemme et al., and in greater detail in the commonly owned copending application Ser No. 097,720 filed Nov. 27, 1979 by Otto Stemme et al.

The construction of the second or rear film unit 11 is analogous to that of the film unit 10, i.e., the film unit 11 also comprises two sheets 11a, 11b and has a leader 11a' which registers with the opening 4 upon transfer of sheets 10a, 10b into the developing unit 17. The inner portions 14a of the corresponding withdrawing element 14 adheres to but being separable from the inner side of the sheet 11b. The outer portion 14b of the element 14 is accessible at the exterior of the side wall 1a.

The stack of film units 10, 11 in the compartment $CT_1$ is biased forwardly toward the aperture 2 (so that the front sheet 10a or 11a is located in a predetermined plane shown as being occupied by the cover sheet 9) by a pressure plate 7 which is urged forwardly by one or more leaf springs 8 which react against the partition 5. The exposed tips of the outer portions 12b, 13b, 14b are preferably staggered so as to allow for convenient grasping by the fingers of an operator or by an automatic extracting device, not shown. The tip of the portion 12b extends outwardly beyond the tip of the portion 13b etc. The portions 12b–14b can be colored differently for convenient recognition by an operator.

The projection 6 may but need not form an integral part of the partition 5. Also, a fully loaded housing 1 can contain a substantial number of film units (i.e., additional film units in front of the unit 10 and/or behind the unit 11), and each film unit can be located behind a cover sheet corresponding to the cover sheet 9. This is shown in FIG. 1a which illustrates a stack of two film units 10, 11, a cover sheet 9 in front of the unit 10, and a cover sheet 109 in front of the unit 11. The withdrawing element for the cover sheet 109 is shown at 112.

The dimensions of the pressure plate 7 may equal those of a rear sheet 10b or 11b, and may slightly or substantially exceed the dimensions of the aperture 2.

An advantage of the portions 10a', 11a' of the respective negative sheets 10a, 11a is that they allow for more convenient separation of the sheets 10a, 11a from the associated sheets 10b, 11b during transport through the developing unit 17. Reference may be had to the aforementioned copending application Ser. No. 097,720 of Otto Stemme et al. which shows automatic separating means for the sheets of a film unit which is transported through a developing unit.

The exact nature of the adhesive which separably bonds the portions 13a, 14a of the withdrawing elements 13, 14 to the corresponding sheets 10b, 11b forms no part of the invention. All that counts is to ensure reliable separation without any damage to the film unit 10 or 11 during extraction of the portion 13b or 14b from the housing 1 via the opening 3 and predictable entry of the leader 10a' or 11a' into the nip of the driven advancing rolls 16 in the developing unit 17. The bonds should be strong enough to prevent separation while the sheets 10b, 11b and the corresponding portions 13a, 14a move in the direction of the arrow 15. It can be said that the portions 13a, 14a are peeled off the corresponding sheets 10b, 11b as they travel around the rounded portion of the deflecting projection 6 and into the channel CH.

The operation is as follows:

The housing 1 is inserted into a photographic apparatus (e.g., into a copying machine), and the operator focuses the image of the first object to be photographed onto the cover sheet 9. When the focusing step is completed, the cover sheet 9 is withdrawn with the help of the element 12 (i.e., via opening 3 in the side wall 1a) while the copying light is turned off or while a shutter in front of the aperture 2 is caused to close. The pressure plate 7 moves the film units 10, 11 forwardly so that the sheet 10a is advanced into the plane previously occupied by the cover sheet 9 and its leader 10a' is aligned with the opening 4 in the side wall 1b.

The film unit 10 is then exposed to light which is admitted via aperture 2, and the outer portion 13b of the withdrawing element 13 is thereupon extracted via the opening 3 whereby the leader 10a' of the unit 10 enters and moves through the opening 4 and on to the nip of the rolls 16 so as to be advanced through the developing unit 17 wherein the sheets 10a, 10b are separated from each other. Successive increments of the unit 10 advance along a straight path during evacuation from the compartment $CT_1$ of the housing 1. On the other hand, successive increments of the inner portion 13a travel along an arcuate path extending around the projection 6 and, therefore, such increments make an acute angle of at least 30 degrees with the adjacent portions of the sheet 10b which moves straight in the direction of the arrow 15. This results in automatic separation of the element 13 from the unit 10 not earlier than when the leader 10a' enters the nip of the rolls 16. If desired, the rightmost parts of the portions 13a, 14a are not bonded to the respective sheets 10b, 11b so as to further enhance automatic separation of the units 10, 11 from the respective elements 13, 14 in response to extraction of the portions 13b, 14b through the opening 3 of the housing 1. The direction of movement of the unit 10 or 11 (as indicated by the arrow 15) is fixed and remains unchanged as the leader 10a' or 11a' enters the nip of the rolls 16 and begins to advance into the liquid bath (not shown) in the developing unit 17. This further enhances the separation of the portions 13a, 14a from the corresponding sheets 10b, 11b. As a rule, the angle between the sheet 10b or 11b (once the leader 10a' or 11a' has reached the rolls 16) and those increments of the portion 13a or 14a which travel around the projection 6 is between 60 and 80 degrees so as to ensure full separation of the withdrawing elements 13 and 14 from the respective film units 10 and 11.

The spring 8 causes the pressure plate 7 to move the sheet 11a of the film unit 11 into a plane immediately behind the aperture 2 as soon as the film unit 10 is fully withdrawn from the housing 1. The apparatus which contains the housing 1 is then ready for the making of the next exposure. Such exposure will or can be preceded by a "test exposure" if the cassette contains a stack of film units and cover sheets 9, 109 of the type shown in FIG. 1a. The cover sheet 109 must be withdrawn prior to exposure of the film unit 11. The provision of a cover sheet for each film unit is desirable when the operator wishes to carry out or check the focusing prior to exposure of each and every film unit in the housing of the improved cassette. Moreover, the provision of cover sheets 9, 109 enables an operator to remove the cassette from the copying machine whenever a cover sheet 9 or 109 is located immediately behind the aperture 2 so that it shields the foremost film unit from light.

As mentioned above, it is possible to furnish the various withdrawing elements in different colors. It is preferred, at this time, to employ a first color for the withdrawing elements 12 and 112, and at least one different second color for the withdrawing elements 13, 14. Analogously, the dimensioning and/or configuration (e.g., the length or width of the accessible portions) of the elements 12, 112 can be different from the dimensioning and/or configuration of the elements 13 and 14. This is of advantage to an amateur photographer who can immediately ascertain whether the aperture 2 is located immediately in front of a cover sheet (9 or 109) or a film unit.

The width of the channel CH (i.e., the spacing between the projection 6 and the side wall 1b) at least equals the combined thickness of all withdrawing elements, i.e., of the maximum number of such elements when the housing 1 contains a full stack of film units and a single cover sheet 9 or a cover sheet 9 plus a requisite number of cover sheets 109.

FIG. 2 shows a modified cassette which further includes an outer housing or casing 18 capable of accommodating housings (1 or 1' or others) of different sizes. The modified cassette of FIG. 2 further comprises a set of inserts 20 (only one shown), one for each different housing, which can be introduced into the casing 18. The housing 1' of FIG. 2 is assumed to be slightly larger or smaller than the housing 1 of the cassette shown in FIG. 1. The associated insert 20 is dimensioned in such a way that it maintains the properly installed housing 1' in a predetermined position with reference to the optical axis of the copying machine wherein the cassette including the casing 18 is put to use.

An advantage of the cassette of FIG. 2 is that the photographer can use one and the same copying machine for the making of exposures on larger or smaller film units. The dimensions of the casing 18 are preferably selected in such a way that its interior can receive, with a certain amount of clearance, the housing of the larger or largest of a series of two or more different housings of cassettes of the type shown in FIG. 1. The empty space around the installed housing 1 or 1' is taken up by the corresponding insert, i.e., by the insert 20 if the casing 18 contains the housing 1'. The basic configuration of the casing 18 can resemble or match that of the housing 1 or 1', depending on the configuration of the chamber which is to receive the casing 18 in a photographic copying machine or the like.

The openings 3' and 4' in the side walls 18a and 18b of the casing 18 respectively register with the openings 3, 4 in the side walls 1a', 1b' of the housing 1'. The insert 20 has cutouts 20A, 20B which respectively allow the film units to advance from the opening 4 into the opening 4' and the withdrawing elements to advance from the opening 3 into the opening 3'. The cutouts 20A, 20B are bounded in part by preferably smooth and flat surfaces 23, 24 which respectively guide the leaders of the film units into the opening 4' and the successive increments of the withdrawing elements (and the cover sheets, if any) into the opening 3'.

The height of the housing 1 preferably matches the height of the housing 1', and the positions of the openings 3, 4 in these housings are selected in such a way that the openings 3, 4 of the properly inserted housing 1 or 1' invariably register with the corresponding openings 3', 4' of the casing 18.

The top wall of the casing 18 is or includes a retractible lid 19 which is shown in fully retracted position so that it fully exposes the aperture 2 in the top wall of the housing 1'. The direction in which the lid 19 is to move in order to seal the aperture of the housing 1 or 1' in the casing 18 against entry of any light is indicated by the arrow 19A.

The insert 20 resembles a rectangular frame whose external surfaces conform to the inner surfaces of the casing 18 and whose inner surfaces are complementary to the external surfaces of the housing 1'.

When the housing 1' is to be replaced with a different housing for larger or smaller film units (e.g., with the housing 1 of FIG. 1), the casing 18 is removed from the chamber of the copying machine and the housing 1' and insert 20 are removed from the interior of the casing. The latter is then ready to receive a housing 1 (which contains at least one film unit) and the corresponding insert. If the housing 1' is to be merely replaced by another housing 1' which contains a full stack of film units, the insert 20 can remain in the casing 18.

The insertion of a fresh housing 1 or 1' into the casing 18 (subsequent to insertion of the appropriate insert, such as 20) is carried out in such a way that the outer portions 12b, 13b, 14b, etc. or 12b, 13b, 112, 14b, etc. of the stack in the freshly inserted housing are threaded outwardly through the opening 3' of the casing 18 before the housing 1 or 1' fully enters the space within the confines of the respective insert.

An important advantage of each embodiment of the improved cassette is that successive film units can be automatically expelled from the respective housing (such as 1 or 1') by the simple expedient of extracting the corresponding withdrawing elements (which may constitute webs, tapes, strips or even cords) via the opening 3 or 3'. The expulsion of the film units can take place directly into a suitable developing unit. A presently preferred use of the improved cassette is in apparatus or machines wherein the exposing and developing units are installed in a common enclosure. However, the cassette can be used with equal advantage in many other machines or apparatus, e.g., in instant-picture cameras.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A cassette comprising a stack of film units each having at least two overlapping sheets, one of said sheets including a leader portion, each of said film units further including a flexible first withdrawing element which comprises a first portion separably secured to the corresponding unit and a second portion, extending beyond the leader of the respective unit; a cover sheet interposed between each pair of film units in said stack, each of said cover sheets having a substantially white surface and including a second withdrawing element; and a housing for said stack and said cover sheets having an aperture for exposure of successive film units of said stack to light, said aperture facing said white surfaces of said cover sheets, and said housing being provided with a first opening for expulsion of said film units therefrom and a second opening for expulsion of said withdrawing elements and cover sheets therefrom, said housing including means for deflecting said second withdrawing elements and second portions of said first withdrawing elements towards said second opening, and said second withdrawing elements and second portions of said first withdrawing elements extending through and outwardly beyond said second opening, said deflecting means and second portions of said first withdrawing elements being arranged such that extraction of said second portions of said first withdrawing elements from said housing via said second opening causes the leaders of the corresponding film units to enter said first opening.

2. The cassette of claim 1, wherein said housing has first and second side walls disposed opposite each other and said first and second openings are respectively provided in said first and second side walls.

3. The cassette of claim 1, further comprising means for maintaining successive units of said stack in a predetermined plane during exposure of said units to light entering via said aperature, said first opening being disposed at the general level of said plane.

4. The cassette of claim 1, wherein said deflecting means is adjacent to but spaced apart from said first opening.

5. The cassette of claim 4, wherein the spacing between said deflecting means and said first opening at least equals the combined thickness of all withdrawing elements in said housing when the latter contains a full stack of film units.

6. The cassette of claim 1, wherein said deflecting means includes a partition which divides the interior of said housing into a first compartment for said stack and said first portions of said first withdrawing elements and a second compartment for said second portions of said first withdrawing elements.

7. The cassette of claim 6, wherein said first compartment communicates with said aperture and with said first opening, and said second compartment communicates with said second opening.

8. The cassette of claim 6, wherein said partition includes a portion which defines with said housing a channel adjacent to said first opening and connecting said first compartment with said second compartment, said second portion of said first withdrawing elements extending through said channel.

9. The cassette of claim 1, further comprising a casing for said housing, and an insert installed between said casing and said housing for maintaining the latter in a predetermined position in the interior of said casing, said casing having first and second openings respectively aligned with said first and second openings of said housing.

10. The cassette of claim 9, wherein said insert has cutouts between the aligned openings of said housing and said casing.

11. The cassette of claim 10, wherein said insert has a first guide surface bounding one of said cutouts and extending between said second opening of said housing and said second opening of said casing to guide said second portions of said first withdrawing elements, and a second guide surface extending between said first opening of said housing and said first opening of said casing to guide said leaders.

12. The cassette of claim 1, wherein said first portions of said first withdrawing elements are separable from said film units in response to travel of said second portions of said first withdrawing elements along a first path which deviates from the path of movement of said film units, said deflecting means defining said first path, and said first path extending to said second opening and deviating sufficiently from said path of movement while said leaders are advanced toward and into said first opening to effect automatic separation of said first portions of said first withdrawing elements from said units while said second portions of said first withdrawing elements move along first path to thereby cause entry of said leaders into said first opening.

13. The cassette of claim 12, wherein said path of movement is a straight path and said deflecting means is immediately adjacent said straight path.

14. The cassette of claim 12, wherein each of said film units includes a first sheet nearer to and a second sheet more distant from said aperture, each first sheet extending beyond the second sheet of the respective unit in a direction toward said first opening, and that portion of each first sheet which extends beyond the corresponding second sheet constituting the leader of the respective unit.

15. The cassette of claim 14, wherein the second sheet of each unit has a side facing away from the corresponding first sheet and the first portion of each first withdrawing element adheres to such side of the respective second sheet.

16. The cassette of claim 15, wherein said first portions of said first withdrawing elements are shorter than the respective second sheets as considered in the direction of movement of said leaders toward said first opening.

17. The cassette of claim 14, wherein said first portions of said first withdrawing elements are bonded to the respective second sheets so as to adhere to said second sheets while the direction of movement of said second portions coincides with the direction of movement of said leaders toward said first opening.

18. The cassette of claim 17, wherein the nature of the bond between said first portions and the respective second sheets is such that said first portions adhere to said second sheets as long as the directions in which said first portions and the corresponding units are moved make an angle of less than approximately 30 degrees.

19. The cassette of claim 1, further comprising an additional cover sheet in said housing immediately adjacent to said aperture, and an additional withdrawing element connected with said additional cover sheet, said additional withdrawing element extending through and outwardly beyond said second opening.

20. The cassette of claim 19, wherein said additional cover sheet has a substantially white surface facing said aperture.

* * * * *